United States Patent
Huang

(10) Patent No.: US 10,239,008 B2
(45) Date of Patent: Mar. 26, 2019

(54) DUST REMOVER WITH THICKNESS-CONTROLLABLE, SORTED AND CONTINUOUS ACCUMULATION SHELF LAYER, AND OPERATION METHOD THEREOF

(71) Applicants: Foshan Human Habitat Environmental Protection Engineering Co., Ltd., Foshan (CN); Qingbao Huang, Foshan (CN)

(72) Inventor: Qingbao Huang, Foshan (CN)

(73) Assignee: Foshan Human Habitat Environmental Protection Engineering Co., Ltd., Foshan, Guangdong (CN)

( * ) Notice: Subject to any disclaimer, the term of this patent is extended or adjusted under 35 U.S.C. 154(b) by 27 days.

(21) Appl. No.: 14/917,674

(22) PCT Filed: Jul. 23, 2014

(86) PCT No.: PCT/CN2014/082817
§ 371 (c)(1),
(2) Date: Mar. 9, 2016

(87) PCT Pub. No.: WO2015/032246
PCT Pub. Date: Mar. 12, 2015

(65) Prior Publication Data
US 2016/0220936 A1  Aug. 4, 2016

(30) Foreign Application Priority Data

Sep. 9, 2013  (CN) .......................... 2013 1 0408003

(51) Int. Cl.
| | | |
|---|---|---|
| *B01D 46/00* | (2006.01) | |
| *B01D 46/04* | (2006.01) | |
| *B01D 46/42* | (2006.01) | |
| *B01D 46/46* | (2006.01) | |

(52) U.S. Cl.
CPC ......... *B01D 46/0068* (2013.01); *B01D 46/04* (2013.01); *B01D 46/42* (2013.01); *B01D 46/46* (2013.01)

(58) Field of Classification Search
CPC .... B01D 46/00; B01D 46/0068; B01D 46/04; B01D 46/42; B01D 46/46
USPC ...... 55/282–305, 341.1–341.7; 95/19–22, 26
See application file for complete search history.

(56) References Cited

U.S. PATENT DOCUMENTS

| | | |
|---|---|---|
| 3,861,893 A | 1/1975 | Smith et al. |
| 3,893,833 A | 7/1975 | Ulvestad |
| (Continued) | | |

FOREIGN PATENT DOCUMENTS

| | | |
|---|---|---|
| CN | 2905187 | 5/2007 |
| CN | 101716444 | 6/2010 |
| (Continued) | | |

*Primary Examiner* — T. Bennett McKenzie
(74) *Attorney, Agent, or Firm* — McDonnell Boehnen Hulbert & Berghoff LLP

(57) ABSTRACT

The present invention belongs to the field of environmentally dust removing equipment apparatus, and specifically relates to a dust remover with a thickness-controllable, sorted and continuous accumulation shelf layer, and an operation method thereof. The dust remover comprises a gas purification chamber, a dust filtration chamber, an ash bucket and a high-pressure gas pulse-jet deashing device. A valve is provided on the exhaust gas inlet pipe and/or the purified gas outlet pipe. The distance L from the inlet pipe valve to the exhaust gas inlet of the filtration chamber is 0-1.0 m or 1.0-10 m. Two or more dust removers are communicated with the dust source separately or in parallel, so as to form a group of dust removers. When the dust remover performs off-line deashing, the valve on the exhaust gas inlet pipe and/or the purified gas outlet pipe is closed, and the pulse-jet deashing device is started up to perform jet deashing. After it completes the jet deashing and waits for a (Continued)

time ΔT, the valve on the exhaust gas inlet pipe and/or the purified gas outlet pipe is opened to continuously perform the dedusting. The present invention provides a new dedusting mode with the "super accumulation shelf layer," which significantly improves the filtration accuracy and the dedusting efficiency of the dust remover.

4 Claims, 2 Drawing Sheets

(56) References Cited

U.S. PATENT DOCUMENTS

| | | | | |
|---|---|---|---|---|
| 4,865,627 | A * | 9/1989 | Dewitz | B01D 46/002 55/283 |
| 5,108,473 | A * | 4/1992 | Hayden, Sr. | B01D 46/0067 137/625.2 |
| 2003/0041729 | A1 * | 3/2003 | Finigan | B01D 46/0058 95/26 |
| 2003/0200733 | A1 * | 10/2003 | Jung | B01D 46/002 55/302 |
| 2013/0276628 | A1 * | 10/2013 | Chalabi | B01D 46/0058 95/9 |

FOREIGN PATENT DOCUMENTS

| | | |
|---|---|---|
| CN | 202460335 | 10/2012 |
| CN | 202460335 U | 10/2012 |
| CN | 103041654 | 4/2013 |
| CN | 103041654 A | 4/2013 |
| CN | 103463896 | 12/2013 |

* cited by examiner

DUST REMOVER WITH THICKNESS-CONTROLLABLE, SORTED AND CONTINUOUS ACCUMULATION SHELF LAYER, AND OPERATION METHOD THEREOF

CROSS-REFERENCE

This application is a section 371 national phase application based PCT/CN2014/082817, filed Jul. 23, 2014, which claims priority to Chinese Patent Appl. No. 20130408003.4, filed Sep. 9, 2013, which are incorporated by reference in its entirety.

FIELD OF THE INVENTION

The present invention belongs to the field of environmentally dust removing apparatus, and specifically relates to a dust remover with a thickness-controllable, sorted and continuous accumulation shelf layer, and an operation method thereof.

BACKGROUND ART

Generally, in metallurgy, machinery, chemicals, building materials and other production industries and during energy conversion process of boilers and furnaces or the like, a huge amount of dust gas is generated, and an environmentally dust removing process is required. Currently, the major environmentally dust removing processes comprise 3 types of processes of water spraying dedusting, bag dedusting and electrostatic dedusting. Among them, the bag dedusting is mainly used, and the utilization ratio is more than 80%, which will increase in the future. Further, the bag dust remover mainly comprises an outer-filer type bag or filter cartridge dust remover, the utilization ratio of which is more than 90%.

The traditional outer-filer type bag or filter cartridge dust remover always adopts the "online pulse-jet deashing" process, during which the dust remover performs dedusting and deashing simultaneously. In this case, the internal space of the dust remover body and the external space of the pipeline are communicated without being blocked and with airstream flowing therebetween. The basic working principle thereof is as follows.

During the filtration process of the dust remover, due to a negative pressure, an accumulation shelf layer (dust layer) is generally formed on the filter cloth surface. At the beginning, the accumulation shelf layer (dust layer) is very thin and has a small resistance value. As the dedusting time elapses, its thickness increases, and thus its resistance value increases. Since the accumulation shelf layer (dust layer) is generally uniformly distributed on the filter cloth surface, it serves to supportively enhance the filtering accuracy of the filter cloth.

When the accumulation shelf layer (dust layer) reaches a certain thickness, if the sum of the resistance value of the accumulation shelf layer and other additional resistance values of the dust remover reaches the designed resistance value 1,000-1,200 Pa of the dust remover, the dust remover may start up the pulse-jet deashing device to perform pulse-jet deashing. At this time, the filtration chamber is in an open space under the negative pressure, that is, it is not blocked from the external space, and an airstream flows therebetween.

The purpose of each pulse-jet deashing is to break the already formed accumulation shelf layer (dust layer) having the certain thickness so as to make it thinner and thus to obtain a new accumulation shelf layer (dust layer) having a reduced resistance value. Therefore, the accumulation shelf layer (dust layer) is often broken by the pulse-jet deashing, and after the accumulation shelf layer (dust layer) is regenerated, it is broken by the pulse-jet deashing again. Such process is repeated as a traditional dedusting mode of "accumulation shelf layer (dust layer)—pulse jet breaking accumulation shelf layer (dust layer)—accumulation shelf layer (dust layer)."

Therefore, the traditional "online pulse-jet deashing" outer-filer type bag or filter cartridge dust remover has 3 major insurmountable defects as follows:

1. since the pulse-jet deashing is performed within the open space under the negative pressure, the dust proceeds in three directions after being separated from the bag or the filter cartridge surface: a part (thick, heavy, caking) falls directly into the ash bucket; a part flows with the airstream and attaches to the adjacent bag or filter cartridge surface; and a part also attaches to the original bag or filter cartridge surface after the jetted high-pressure airstream disappears. Therefore, the dust on the filter cloth cannot be cleaned completely.

2. at the moment that the high-pressure gas pulse-jet deashing is performed, micropores of the filter cloth have to be expanded, and at the moment that the high-pressure airstream disappears and a negative pressure is created, many dust particles may pass through the expanded micropores, and thus the filtration accuracy and efficiency of the filter cloth are reduced. Since the frequency at which the pulse-jet deashing is performed is high, the influence of such moments may be accumulated to an extent that the filtration accuracy and efficiency of the filter cloth are severely affected.

3. as described above, first, since the purpose of each pulse-jet deashing is to break the accumulation shelf layer (dust layer), the accumulation shelf layer (dust layer) has no continuity; second, after the pulse-jet deashing, the new dust and the old dust always arrive at the filter cloth surface at the same time to form a new accumulation shelf layer (dust layer), thus the sizes of the dust particles forming the accumulation shelf layer (dust layer) are not sorted; and third, after each pulse-jet deashing, a new balance of resistance value is required again, and thus the thickness of the accumulation shelf layer (dust layer) is substantially constant, which is not controllable.

As described above, as to the supportive enhancement of the filtration accuracy and efficiency of the filter cloth by the accumulation shelf layer (dust layer), it is counteracted by an inherent defect of the micropore expansion of the filter cloth at the moment of on-line pulse-jet deashing and also by an inherent defect of the thickness-uncontrollable, discontinuous and unsorted accumulation shelf layer (dust layer).

To solve the problem of incomplete cleaning of the filter cloth, an invention patent application entitled "Closed pulse dust remover and dedusting method thereof," (Application No: 201310007537.6) and a utility model entitled "Off-line cleaning flat bag type dust remover" (Patent No: 201220070395.9) propose a solution in which a valve is provided at the outlet of the purified gas, and the purpose thereof is to achieve an off-line cleaning. However, this solution cannot generate a thickness-controllable, sorted and continuous super accumulation shelf layer.

SUMMARY OF THE INVENTION

With respect to the above described 3 insurmountable inherent defects of the traditional dedusting, the technical problem to be solved by the present invention is to provide a technical solution involving a thickness-controllable, sorted and continuous accumulation shelf layer and obtain a new dedusting mode of "filter cloth+super accumulation shelf layer+dust layer—pulse-jet breaking dust layer—filter cloth+super accumulation shelf layer+dust layer."

A dust remover with a thickness-controllable, sorted and continuous accumulation shelf layer and an operation method thereof are provided. The dust remover comprises a gas purification chamber, a dust filtration chamber, an ash bucket and a high-pressure gas pulse-jet deashing device, wherein an purified gas outlet of the gas purification chamber is connected to an purified gas outlet pipe which is communicated with an exhaust fan; a dust-containing exhaust gas inlet of the dust filtration chamber is connected to the exhaust gas inlet pipe which is communicated with a dust source; a bag or filter cartridge is provided inside the dust filtration chamber, and an open end of the bag or filter cartridge is communicated with the gas purification chamber; the high-pressure gas pulse-jet deashing device is provided above the open end of bag or the filter cartridge, and the ash bucket is provided at the end of the filtration chamber; and a sealable cinder valve is provided at the end of the ash bucket, and a valve is provided on the exhaust gas inlet pipe and/or the purified gas outlet pipe.

Further, the distance L from the exhaust gas inlet pipe valve to the exhaust gas inlet of the dust remover is less than 1.0 m. When the dust remover needs to perform off-line deashing after a period of dedusting, the valve on the exhaust gas inlet pipe and/or the purified gas outlet pipe is closed, and then the high-pressure gas pulse-jet deashing device is started up to perform jet deashing on the bag or filter cartridge, wherein the cycle of the pulse-jet deashing is $\Sigma T=[n(t_1+t_2)+t_3]x$, wherein pulse width $t_1$ is 80-120 ms, pulse interval $t_2$ is 10-300 s, the number of the pulse-jet devices is n, small cycle interval $t_3$ is 10-300 s, and the number of small cycles x is 2-4. After the high-pressure gas pulse-jet deashing device completes the jet deashing and waits for an interval time $\Delta T$, the valve on the exhaust gas inlet pipe and/or the purified gas outlet pipe is opened, and $\Delta T$ is 300 s to 3600 s.

In addition, the distance L from the exhaust gas inlet pipe valve to the exhaust gas inlet of the dust remover may be 1.0 m to 10 m. When the dust remover needs to perform off-line deashing after a period of dedusting, the valve on the exhaust gas inlet pipe and/or the purified gas outlet pipe is closed, and then the high-pressure gas pulse-jet deashing device is started up to perform jet deashing on the bag or filter cartridge, wherein the cycle of the pulse-jet deashing is $\Sigma T=[n(t_1+t_2)+t_3]x$, wherein pulse width $t_1$ is 80-120 ms, pulse interval $t_2$ is 1-20 s, the number of the pulse-jet devices is n, small cycle interval $t_3$ is 1-20 s, and the number of small cycles x is 1-2. After the high-pressure gas pulse-jet deashing device completes the jet and waits for an interval time $\Delta T$, the valve on the exhaust gas inlet pipe and/or the purified gas outlet pipe, is opened and $\Delta T$ is 0 s to 300 s.

The present invention achieves a new dedusting mode of "filter cloth+super accumulation shelf layer+dust layer—pulse-jet breaking dust layer—filter cloth+super accumulation shelf layer+dust layer," so as to significantly improve the filtration accuracy and the dedusting efficiency of the dust remover by the filtration accuracy of the filter cloth itself and also by the super accumulation shelf layer.

Hereinafter, the present invention will be described in detail with reference to the accompanying drawings and the embodiments.

DESCRIPTION OF ATTACHED DRAWINGS

DETAILED DESCRIPTION OF PREFERRED EMBODIMENTS

Figure 1:
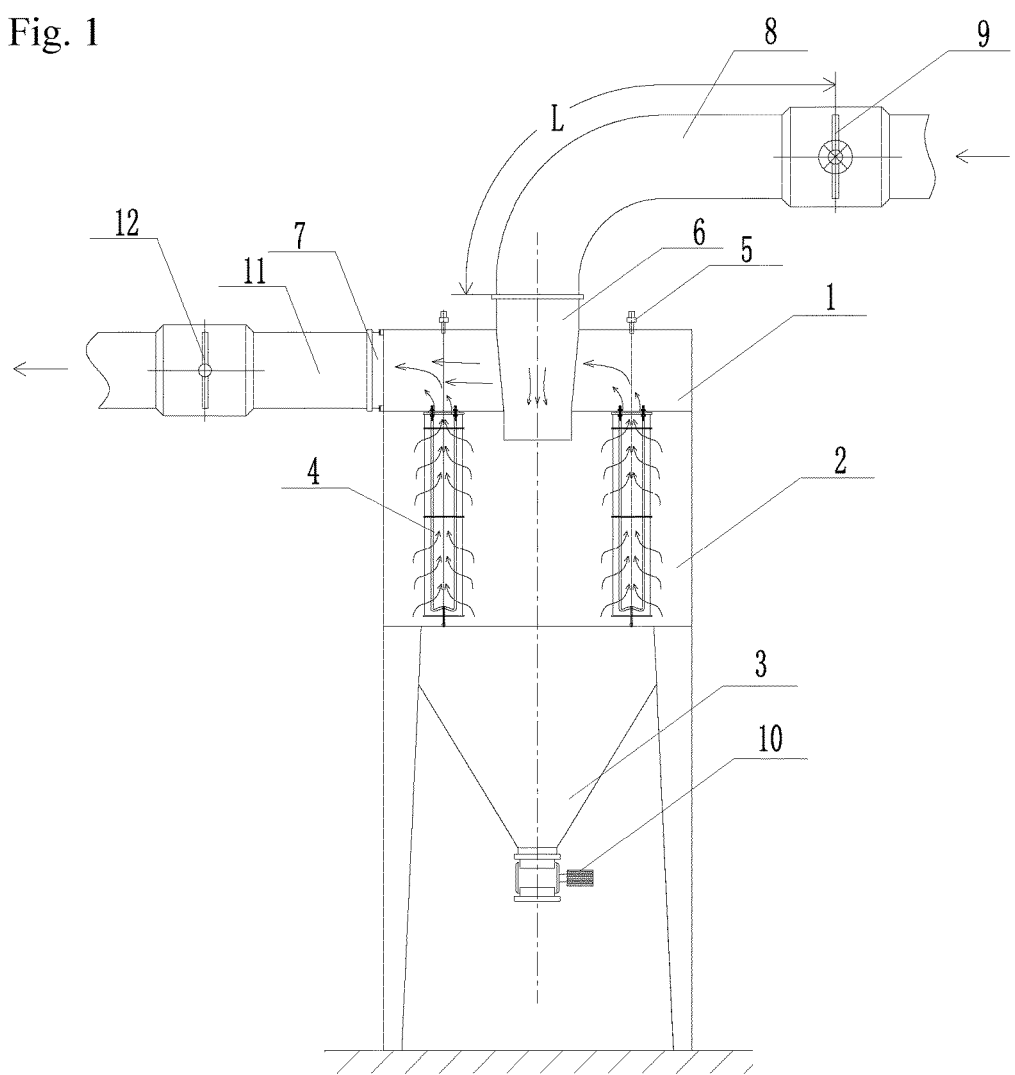
FIG. 1 is the structural schematic view of the first embodiment of the present invention.

FIG. 1 is the structural schematic view of the first embodiment of the present invention. As shown in the figure, the dust remover comprises a gas purification chamber 1, a dust filtration chamber 2, an ash bucket 3, a filter cartridge 4 and a high-pressure gas pulse-jet deashing device 5. The filter cartridge 4 is provided inside the dust filtration chamber 2, and an open end of the filter cartridge is communicated with the gas purification chamber 1. The high-pressure gas pulse-jet deashing device 5 is provided above the open end of the filter cartridge, and a dust-containing exhaust gas inlet 6 of the dust filtration chamber 2 is connected to an exhaust gas inlet pipe 8 which is communicated with a dust source. An inlet pipe valve 9 is provided on the exhaust gas inlet pipe 8, the ash bucket 3 is provided at the lower end of the filtration chamber 2, and a sealable cinder valve 10 is provided at the lower end of the ash bucket 3. A purified gas outlet 7 of the gas purification chamber 1 is connected to a purified gas outlet pipe 11, and an outlet pipe valve 12 is provided on the purified gas outlet pipe 11 which is communicated with an exhaust fan.

When the dust remover needs to perform "off-line pulse-jet deashing" after a period of dedusting, the inlet pipe valve 9 is closed, so that a static space in which no airstream flows is formed inside the dust remover. At this time, the cinder valve 10 is also sealed because of its function of discharging dust in a sealed state. The outlet pipe valve 12 may be in a closed state or in an open state. Then, the high-pressure gas pulse-jet deashing device 5 is started up to perform "off-line pulse-jet deashing" on the filter cartridge 4. After the high-pressure gas pulse-jet deashing device completes the jet cycle $\Sigma T$ and waits for an interval time $\Delta T$, the inlet pipe valve 9 is opened to continue the on-line dedusting. At this time, the outlet pipe valve 12 is also in an open state. Obviously, the outlet pipe valve may not be provided, and only the inlet pipe valve is provided.

When the dust remover turns into the dedusting after completing the off-line pulse-jet deashing, the inlet pipe valve 9 of the dust remover is opened. At this time, the outlet pipe valve 12 has to be in an open state, and the static space, in which no airstream flows, of the dust filtration chamber inside the dust remover is destroyed immediately, and the whole bag or filter cartridge surface is under a negative pressure immediately. Since there is a spatial distance difference between the valve 9 of the exhaust gas inlet pipe and the surface of the bag or filter cartridge 4 of the filtration chamber, there is a little time difference between the times when the new dust and the old dust arrive at the surface of the bag or filter cartridge 4 respectively. During such a little time difference, after being subjected to a sufficient gravity sorting in the static space, in which no airstream flows, of the dust filtration chamber, the old fine-ultrafine dust particles that are still suspended near the surface of the bag or filter cartridge 4 are attached to the whole surface of the bag or the filter cartridge 4 immediately due to the negative pressure, and are uniformly distributed to form a new accumulation shelf layer. After that, the new dust arrives. A "super accumulation shelf layer" is defined as below: this layer is completely comprised of the sorted fine-ultrafine dust particles and is always broken by the off-line pulse jet, but always can be formed during the time difference before the new dust arrives at the surface of the bag or the filter cartridge 4, and this layer is actually continuous while its shape is discontinuous. Therefore, the super accumulation shelf layer is completely different from the traditional accumulation shelf layer (dust layer).

The super accumulation shelf layer of the present invention has the following features and advantages: (1) gravity sorting: the super accumulation shelf layer is formed of ultrafine-fine dust particles that are subjected to the gravity sorting to have substantially the same size, and such accumulation shelf layer has an ultra-precise and ultra-efficient filtering effect and an optimal permeability, that is, the resistance value per unit thickness of the super accumulation shelf layer is the minimum; (2) continuity: once such super accumulation shelf layer is formed, it cannot be broken by the pulse jet and may automatically remain, and it is broken only when the dust remover stops; and (3) thickness controllability: the thickness of such super accumulation shelf layer is artificially controllable, and the control manner is achieved by adjusting the following 3 parameters: jet cycle $\Sigma T$, awaiting interval time $\Delta T$ and distance L from the exhaust gas inlet pipe valve to the exhaust gas inlet of the filtration chamber.

If the fine-ultrafine particles of the dust contained in the exhaust gas have a large proportion and a little specific weight, for example, in the case of the exhaust gas containing expanded carbon-graphite dust generated during the filler production process of the alkaline battery industry, the gravity sedimentation effect of the dust is slow. In this case, the thickness of the super accumulation shelf layer needs to be controlled to be reduced. Since such fine-ultrafine particles of the dust have a large proportion and a little specific weight, the efficiency of the gravity sorting is low, and the gravity sedimentation effect is slow. In order to cause the thickness of the super accumulation shelf layer not to be super thick, the gravity sedimentation time needs to be prolonged to enhance the gravity sedimentation effect and to allow the gravity sorting to be thoroughly performed. Meanwhile, the aggregation time is shortened. The specific steps are as follows: firstly, the jet cycle $\Sigma T$ of the high-pressure gas pulse jet should be prolonged, and $\Sigma T$ is set as $\Sigma T=[n(t_1+t_2)+t_3]x$, wherein the pulse width $t_1$ is 80-120 ms, pulse interval $t_2$ is 200-300 s, the number of the pulse-jet devices is n, the small cycle interval $t_3$ is 200-300 s, and the number of small cycles x is 3-4; secondly, the awaiting interval time $\Delta T$ should be prolonged, and $\Delta T$ is set as $\Delta T=1200-3600$ s; and thirdly, in the case where the exhaust gas inlet pipe valve is provided, the distance L from the exhaust gas inlet pipe valve to the exhaust gas inlet of the dust remover should be shortened, and L=0-1.0 m. Since the value of L is less than 1.0 m and may be as less as zero, the time difference before the arrival of the new dust is also little. Thus, the time difference between the times when the new dust and the old dust arrive at the bag or filter cartridge surface approaches to be the minimum so that the aggregation time of the super accumulation shelf layer is shortened to be the minimum, the aggregation effect is weakened, and the super accumulation shelf layer would not be super thick. Obviously, in this case, the exhaust gas inlet pipe valve may not be provided, and only the purified gas outlet pipe valve is provided.

If the fine-ultrafine particles of the dust contained in the exhaust gas have a little proportion and a large specific weight, for example, in the case of the exhaust gas containing lead dust generated during the cutting, polishing production process of the lead plate of lead-acid battery industry, such dust gravity sedimentation effect is fast. In this case, the thickness of the super accumulation shelf layer needs to be controlled to be increased. Since such fine-ultrafine particles of the dust have a little proportion and a large specific weight, the efficiency of the gravity sorting is high, and the gravity sedimentation effect is fast. In order to ensure the required thickness of the super accumulation shelf layer, the gravity sedimentation time must be shortened to weaken the gravity sedimentation effect, and the aggregating time should be prolonged at the same time. The specific steps are as follows: firstly, the jet cycle $\Sigma T$ of the high-pressure gas pulse jet is shortened, and $\Sigma T$ is set as $\Sigma T=[n(t_1+t_2)+t_3]x$, wherein the pulse width $t_1$ is 80-120 ms, the pulse interval $t_2$ is 1-3 s, the number of the pulse-jet devices is n, the small cycle interval $t_3$ is 1-3 s, and the number of small cycles x is 1-2; secondly, the awaiting interval time $\Delta T$ is shortened until zero, and $\Delta T$ is set as $\Delta T=0-20$ s; and thirdly, the distance L from the exhaust gas inlet pipe valve to the exhaust gas inlet of the dust remover is prolonged, and L is set as L=6-10 m. Since the value of L is prolonged to 6-10 m, the time difference of the new dust arrival is correspondingly prolonged as well, so that the time difference between the times when the new dust and old dust arrive at the bag or filter cartridge surface is correspondingly prolonged, hereby prolonging the aggregation time of the super accumulation shelf layer to be the maximum and enhancing the aggregation effect to ensure the required thickness of the super accumulation shelf layer. Obviously, in this case, the purified gas outlet pipe valve may not be provided, and only the exhaust gas inlet pipe valve is provided.

When the fine-ultrafine particle feature and the specific weight feature of the dust contained in the exhaust gas is between the above two cases, the 3 parameters of jet cycle $\Sigma T$, awaiting interval time $\Delta T$ and distance L may be adjusted between the above two cases.

Figure 2:
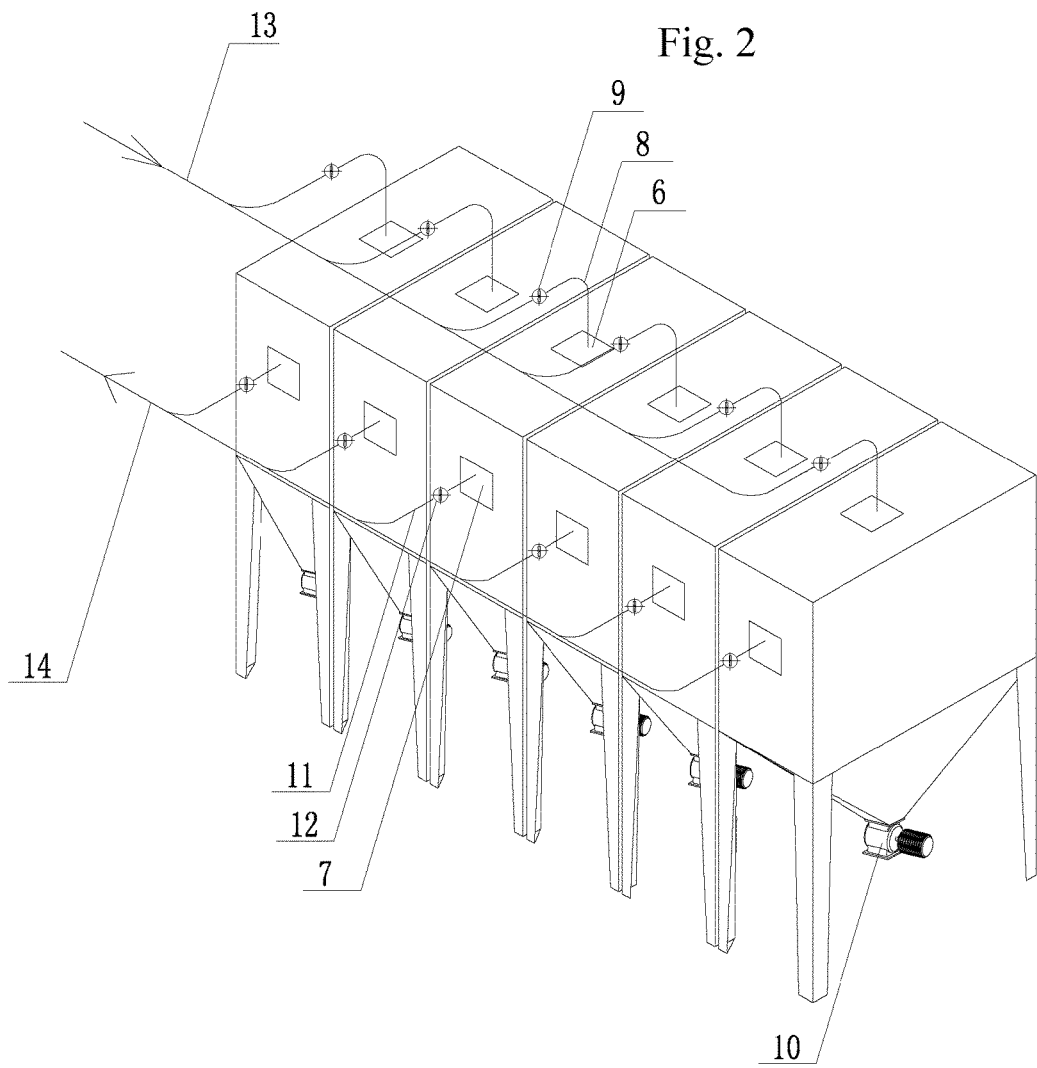
FIG. 2 is the structural schematic view of the second embodiment of the present invention.

FIG. 2 is the structural schematic view of the second embodiment of the present invention. Since the dedusting cannot be continuously performed by one independent dust remover, it is required two or more independent dust removers to be communicated with the dust source separately or in parallel. When one of the independent dust removers needs to perform pulse-jet deashing, the valve on the exhaust gas inlet pipe and/or the purified gas outlet pipe is closed, while the respective valves on the exhaust gas inlet pipes and/or the purified gas outlet pipes of other independent dust removers are open to perform the normal dedusting. Such a process is repeated, so that a group of dust removers can continuously perform the dedusting.

As shown in the figure, the second embodiment comprises 6 independent dust removers communicated with the dust source in parallel to form a group of dust removers. The independent dust removers are each connected to the exhaust gas inlet main pipe 13 and the dust-containing exhaust gas inlets 6 of the independent dust removers via the parallel-connected exhaust gas inlet branch pipes 8, and are connected to the purified gas outlet main pipe 14 and the purified gas outlets 7 of the independent dust removers via the parallel-connected purified gas outlet branch pipes 11. The inlet pipe valves 9 are provided on the parallel-connected exhaust gas inlet branch pipes 8 of the respective dust removers, and the outlet pipe valves 12 are provided on the parallel-connected purified gas outlet branch pipes 11. In the case that the inlet pipe valve is provided, based on the features of the dust particles, the distance L from this valve to the exhaust gas inlet of the dust remover is L=0-1.0 m, or L=1.0-10 m.

When one independent dust remover among the group of dust removers needs to perform the off-line deashing after a period of dedusting, the inlet pipe valve 3 of the independent dust remover is closed. At this time, the cinder valve 10 is also sealed because of its function of charging dust in a sealed state. The outlet pipe valve 12 may be in a closed state or in an open state. Then, the high-pressure gas pulse-jet deashing device is started up to perform "off-line pulse-jet deashing" on the filter cartridge. After the high-pressure gas pulse-jet deashing device completes the jet cycle $\Sigma T$ and waits for an interval time $\Delta T$, the inlet pipe valve and the outlet pipe valve are opened to continue the dedusting operation.

In sum, the controllability and stability of the thickness of the super accumulation shelf layer are key factors to achieve the function of the super accumulation shelf layer. Since the exhaust gases processed by the dust remover are quite different, the features of dust in the exhaust gas are also quite different. In order to achieve the controllability and stability of the thickness of the super accumulation shelf layer, the time of the new dust arrival and the time of the gravity sorting of the old dust (i.e., the jetted dust) in the static space need to be controlled. Thus, the corresponding jet cycle $\Sigma T$, awaiting interval time $\Delta T$ and distance L from the inlet valve to the inlet should be determined based on different exhaust gas features, the specific weight features of the dust and especially the content of the fine-ultrafine particles in the dust.

According to the method of the present invention, on one hand, as the new dust continuously flows in, each jetting brings new fine-ultrafine dust in the static space, in which no airstream flows, of the dust filtration chamber. Therefore, as the dedusting time is prolonged and the number of the off-line pulse-jet deashing is increased, the concentration of the fine-ultrafine dust in the static space, in which no airstream flows, of the dust filtration chamber is increased. On the other hand, as the dedusting time is prolonged and the number of the off-line pulse-jet deashing is increased, the gravity sorting effect inside the dust filtration chamber is more thorough until only the fine-ultrafine dust is left in the dust filtration chamber. Under the combined effect of the two aspects, the super accumulation shelf layer becomes a stable transition layer between the filter material and the dust layer, so that a new dedusting mode of "filter cloth+super accumulation shelf layer+dust layer—pulse jet breaking dust layer—filter cloth+super accumulation shelf layer+dust layer" is formed, and the traditional dedusting mode of "accumulation shelf layer (dust layer)—pulse jet breaking accumulation shelf layer (dust layer)—accumulation shelf layer (dust layer)" is changed.

Since the thickness of the super accumulation shelf layer is controllable, the super accumulation shelf layer may completely replace the traditional accumulation shelf layer. Further, the super accumulation shelf layer may completely replace filtering function of the filter material because the super accumulation shelf layer is continuous. In addition, since the super accumulation shelf layer is sorted, the ultra-precise and ultra-efficient filtering effect of the super accumulation shelf layer can be achieved.

The technology of the present invention provides a new dedusting mode of "filter cloth+super accumulation shelf layer+dust layer—pulse-jet breaking dust layer—filter cloth+super accumulation shelf layer+dust layer," so as to significantly improve the filtration accuracy and the dedusting efficiency of the dust remover by the filtration accuracy of the filter cloth itself and also by the super accumulation shelf layer.

The invention claimed is:

1. An operation method of a dust remover capable of forming a thickness-controllable, sorted and continuous accumulation shelf layer on an outer surface of a bag or filter cartridge, the dust remover comprising a gas purification chamber, a dust filtration chamber, an ash bucket and a high-pressure gas pulse-jet deashing device, wherein a purified gas outlet of the gas purification chamber is connected to a purified gas outlet pipe which is communicated with an exhaust fan; a dust-containing exhaust gas inlet of the dust filtration chamber is connected to an exhaust gas inlet pipe which is communicated with a dust source; the bag or filter cartridge is provided inside the dust filtration chamber, and an open end of the bag or filter cartridge is communicated with the gas purification chamber; the high-pressure gas pulse-jet deashing device is provided above the open end of the bag or filter cartridge, the ash bucket is provided at a lower end of the filtration chamber, and a sealable cinder valve is provided at a lower end of the ash bucket, and a valve is provided on the exhaust gas inlet pipe and/or the purified gas outlet pipe, the method being characterized in that, when the dust remover needs to perform off-line deashing after a period of dedusting, closing the valve on the exhaust gas inlet pipe and/or the purified gas outlet pipe, and then starting up the high-pressure gas pulse-jet deashing device to perform pulse-jet deashing on the bag or filter cartridge, wherein the cycle of the pulse-jet deashing is $\Sigma T$, after the high-pressure gas pulse-jet deashing device completes the pulse-jet deashing and waits for an interval time $\Delta T$, opening the valve on the exhaust gas inlet pipe and/or the purified gas outlet pipe to continue the dedusting, wherein, the thickness controllability of the accumulation shelf layer is achieved by adjusting the jet cycle $\Sigma T$, the interval time $\Delta T$ and a distance L from the valve on the exhaust gas inlet pipe to the exhaust gas inlet of the dust remover.

2. The operation method of claim 1, characterized in that, two or more independent dust removers are communicated with the dust source separately or in parallel to form a group of dust removers, when the valve on the exhaust gas inlet pipe and/or the purified gas outlet pipe of one of the dust removers is closed to perform the off-line deashing, the valves on the exhaust gas inlet pipes and/or the purified gas outlet pipes of other dust removers are opened to perform the dedusting, and this process is repeated, so that the group of dust removers continuously perform the dedusting.

3. An operation method of a dust remover capable of forming a thickness-controllable, sorted and continuous accumulation shelf layer on an outer surface of a bag or filter cartridge, the dust remover comprising a gas purification chamber, a dust filtration chamber, an ash bucket and a high-pressure gas pulse-jet deashing device, wherein a purified gas outlet of the gas purification chamber is connected to a purified gas outlet pipe which is communicated with an exhaust fan; a dust-containing exhaust gas inlet of the dust filtration chamber is connected to an exhaust gas inlet pipe which is communicated with a dust source; the bag or filter cartridge is provided inside the dust filtration chamber, and an open end of the bag or filter cartridge is communicated with the gas purification chamber; the high-pressure gas pulse-jet deashing device is provided above the open end of the bag or filter cartridge, the ash bucket is provided at a lower end of the filtration chamber, and a sealable cinder valve is provided at a lower end of the ash bucket, and a valve is provided on the exhaust gas inlet pipe and/or the purified gas outlet pipe, the method being characterized in that, when the dust remover needs to perform off-line deashing after a period of dedusting, closing the valve on the exhaust gas inlet pipe and/or the purified gas outlet pipe, and then starting up the high-pressure gas pulse-jet deashing device to perform pulse-jet deashing on the bag or filter cartridge, wherein the cycle of the pulse-jet deashing is $\Sigma T$, wherein $\Sigma T=[n(t1+t2)+t3]x$, wherein pulse width t1 is 80-120 ms, pulse interval t2 is 10-300 s, the number of the pulse-jet devices is n, small cycle interval t3 is 10-300 s, and the number of small cycles x is 2-4; and after the high-pressure gas pulse-jet deashing device completes the pulse-jet deashing and waits for an interval time $\Delta T$, opening the valve on the exhaust gas inlet pipe and/or the purified gas outlet pipe to continue the dedusting, wherein the $\Delta T$ is 300 s to 3600 s, and the distance L from the valve on the exhaust gas inlet pipe to the exhaust gas inlet of the dust remover is 0-1.0 m.

4. An operation method of a dust remover capable of forming a thickness-controllable, sorted and continuous accumulation shelf layer on an outer surface of a bag or filter cartridge, the dust remover comprising a gas purification chamber, a dust filtration chamber, an ash bucket and a high-pressure gas pulse-jet deashing device, wherein a purified gas outlet of the gas purification chamber is connected to a purified gas outlet pipe which is communicated with an exhaust fan; a dust-containing exhaust gas inlet of the dust filtration chamber is connected to an exhaust gas inlet pipe which is communicated with a dust source; the bag or filter cartridge is provided inside the dust filtration chamber, and an open end of the bag or filter cartridge is communicated with the gas purification chamber; the high-pressure gas pulse-jet deashing device is provided above the open end of the bag or filter cartridge, the ash bucket is provided at a lower end of the filtration chamber, and a sealable cinder valve is provided at a lower end of the ash bucket, and a valve is provided on the exhaust gas inlet pipe and/or the purified gas outlet pipe, the method being characterized in that, when the dust remover needs to perform off-line deashing after a period of dedusting, closing the valve on the exhaust gas inlet pipe and/or the purified gas outlet pipe, and then starting up the high-pressure gas pulse-jet deashing device to perform pulse-jet deashing on the bag or filter cartridge, wherein the cycle of the pulse-jet deashing is $\Sigma T$, wherein $\Sigma T=[n(t1+t2)+t3]x$, wherein pulse width t1 is 80-120 ms, pulse interval t2 is 1-20 s, the number of the pulse-jet devices is n, small cycle interval t3 is 1-20 s, and the number of small cycles x is 1-2; and after the high-pressure gas pulse-jet deashing device completes the pulse-jet deashing and waits for an interval time $\Delta T$, opening the valve on the exhaust gas inlet pipe and/or the purified gas outlet pipe to continue the dedusting, wherein the $\Delta T$ is 0 s to 300 s, and wherein the distance L from the valve on the exhaust gas inlet pipe to the exhaust gas inlet of the dust remover is 1.0-10 m.

* * * * *